Oct. 19, 1965    V. L. HARDY    3,212,365
METHOD FOR MAKING A RULE CUTTING DEVICE
Filed May 31, 1962    3 Sheets-Sheet 1

INVENTOR
VINCENT L. HARDY
BY Jack N. McCarthy
AGENT

Oct. 19, 1965  V. L. HARDY  3,212,365
METHOD FOR MAKING A RULE CUTTING DEVICE
Filed May 31, 1962  3 Sheets-Sheet 2
FIG. IA
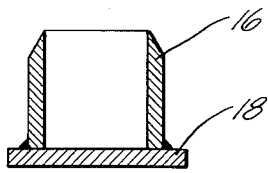
FIG. IB
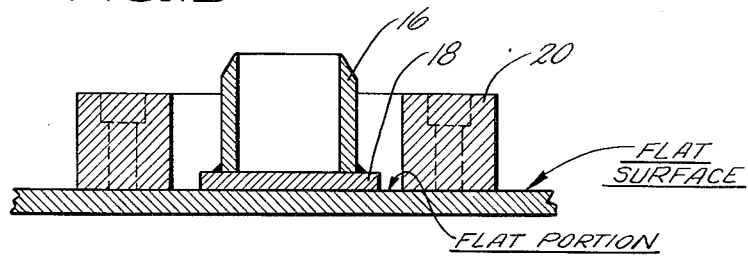
FIG. IC
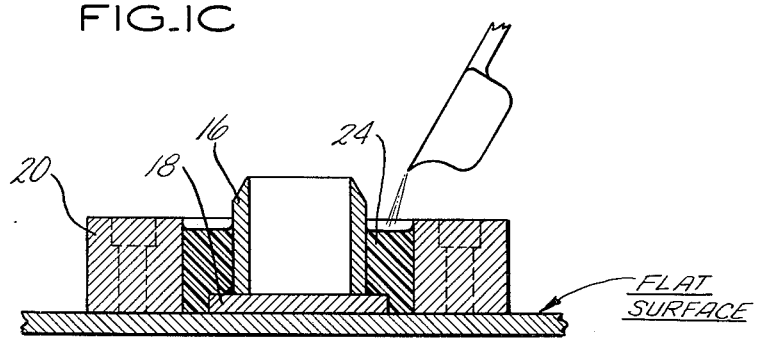
FIG. ID
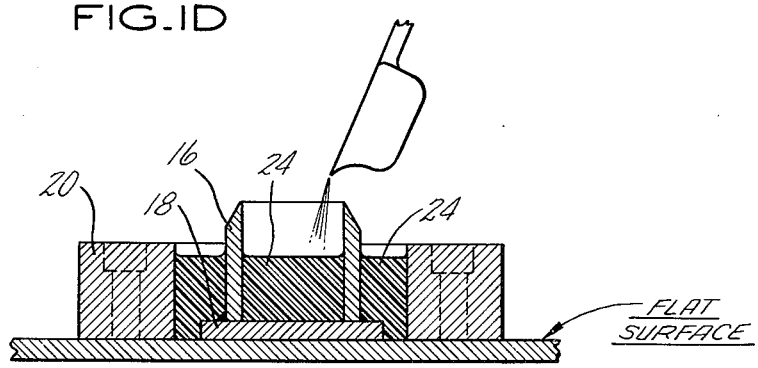
INVENTOR
VINCENT L. HARDY
BY *Jack N. McCarthy*
AGENT Oct. 19, 1965  V. L. HARDY  3,212,365
METHOD FOR MAKING A RULE CUTTING DEVICE
Filed May 31, 1962  3 Sheets-Sheet 3

INVENTOR
VINCENT L. HARDY
BY Jack N. McCarthy
AGENT

United States Patent Office 3,212,365
Patented Oct. 19, 1965

3,212,365
METHOD FOR MAKING A RULE
CUTTING DEVICE
Vincent L. Hardy, Stratford, Conn., assignor to United
Aircraft Corporation, East Hartford, Conn., a corporation of Delaware
Filed May 31, 1962, Ser. No. 199,007
9 Claims. (Cl. 76—107)

This invention relates to a device for cutting sheet material into desired shapes and to the method of making the cutting portion of the device.

An object of this invention is to provide a rule cutting die which can be made without the precision cutting needed for its construction by known fabricating means using only wood supporting structure.

Another object of this invention is to provide a rule cutting die having an extended life.

A further object of this invention is to provide a rule cutting die which maintains its accuracy throughout its usage.

Another object of this invention is to provide a rigid rule cutting device having a rule held within a supporting edge by hardened plastic.

Other objects and advantages will be observed from a reading of the specification and the claims in connection with the drawing.

FIGURE 1A is a view of a metal rule fixed to a backing plate.

FIGURE 1B is a view of a metal rule fixed to a backing plate resting on a flat surface with a surrounding fence.

FIGURE 1C is a view of a metal rule fixed to a backing plate resting on a flat surface with a surrounding fence showing a plastic being poured between the metal rule and surrounding fence.

FIGURE 1D is a view of a metal rule fixed to a backing plate resting on a flat surface with a surrounding fence showing a plastic being poured into the metal rule.

Figure 1:
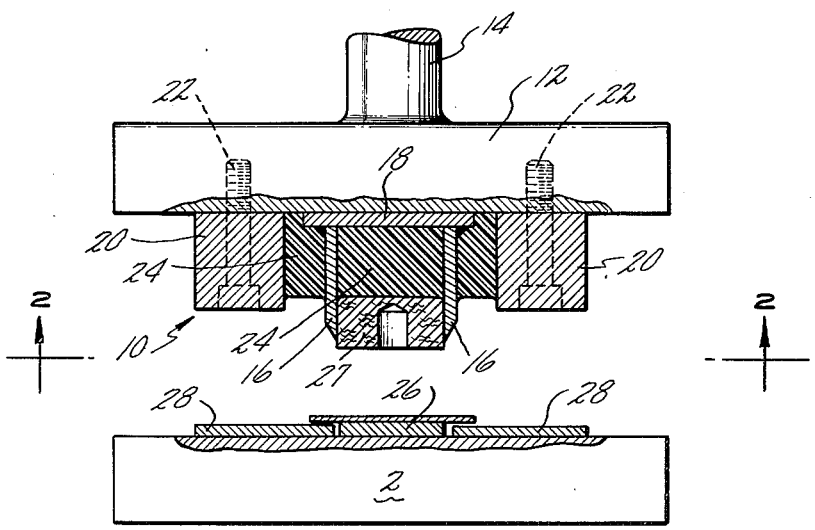
FIG. 1 is a side view of a press, partially in section, showing the cutting device in section attached thereto.
Figure 2:
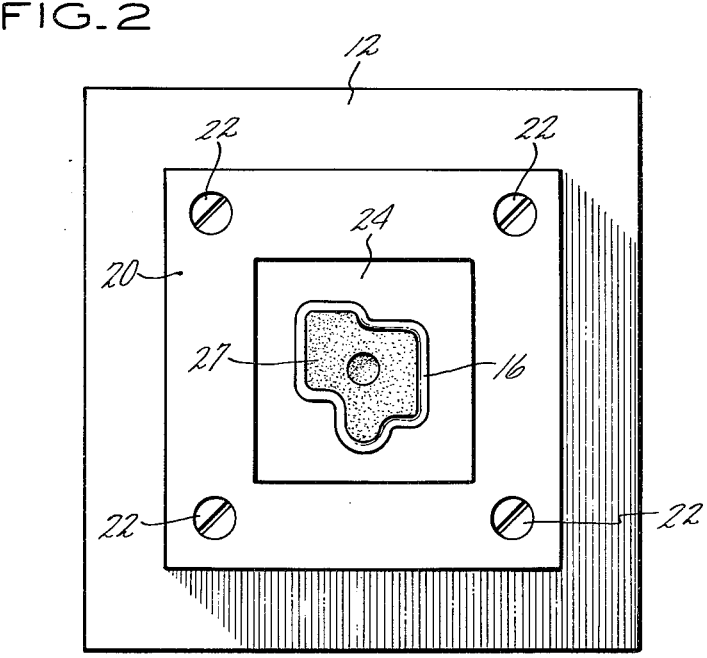
FIG. 2 is a view taken along the line 2—2 of FIG. 1 showing the bottom of the upper half of the cutting device and press.

Referring to FIG. 1 of the drawing, the upper portion, or rule cutting die, 10 of the cutting device is fixed to the upper plate 12 of a press which is movable by the arm 14. Arm 14 lowers and raises the upper portion 10 a predetermined distance to place it in a desired position with relation to a base plate 2 of the press.

The upper portion of the cutting device is fabricated by bending a metal rule 16 to a desired outline and welding it to a rigid metal backing plate 18. For some applications the rule is held in place on the backing plate during fabrication. This unit is placed on a flat surface and surrounded by a supporting fence, or retaining edge member, 20. This fence 20 does not come in contact with the rule 16 or backing plate 18. The height of the fence or retaining edge member 20 is less than the combined height of the thickness of the backing plate 18 and height of the rule, 16 to prevent any interference between the edge of the fence 20 and either the workpiece or any part of the base plate 2 of the press.

When the two parts have been properly positioned, a hardening plastic 24 is poured in the space between the two parts. The hardening plastic is poured to a height which is approximately equal to the height of the fence 20. The interior of the rule 16 is also fitted to the same height with the hardening plastic 24. When the plastic has hardened, the fabricated upper portion is loosened from the flat surface. The fence 20 is fixed to the upper plate 12 of the movable press by bolts 22 which have their heads recessed into the fence within a small countersunk hole.

In FIG. 1, a male mating member 26 is fixed to the top of the base plate 2 of the press. This male mating member 26 is shaped to just fit within the desired outline of the rule 16. The male mating member can be formed by securing a plate to the base plate 2 of its press by suitable means, such as a tape having adhesive on both sides, and by being punched out by the upper portion 10 of the cutting device. The excess material can then be pried from the base plate 2 leaving the male mating member. When cutting soft materials such as rubber, fabric, cork, asbestos and similar materials, the male mating member may be omitted. For blanking aluminum and material of similar strength, the member is used.

A stripper 28 can be used around the outer edge of the male mating member 26 to aid in picking up the remaining part of the work sheet. A stripper 27 is used within the area defined by the rule. This facilitates the removal of die formed pieces. The stripper can be formed by the upper portion of the cutting device. The material of the stripper can be cork, rubber or any other like material. The stripper extends for a small distance above the edge of the rule. Holes can be cut in the stripper to facilitate the meeting of the mating parts of the press. In large dies, small blocks 27a of stripper material may be fixed about the surface.

Figure 3:
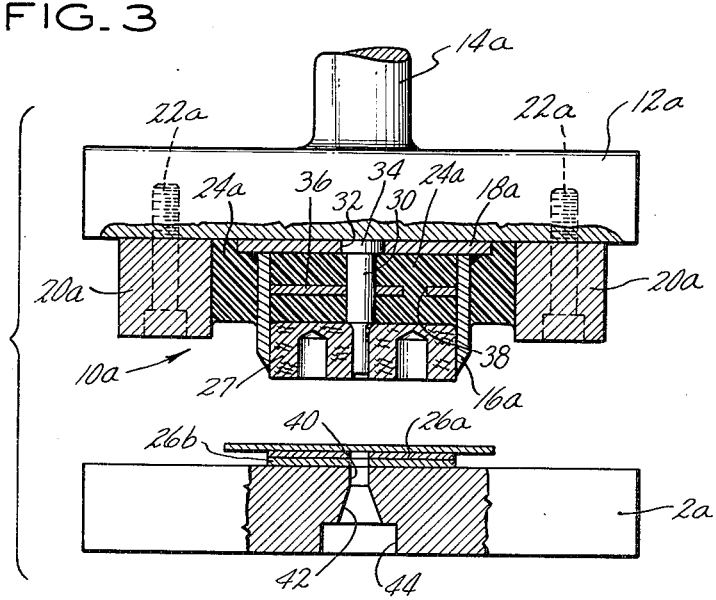
FIG. 3 is a side view similar to FIG. 1 through a press showing another modification of the cutting device.

FIG. 3 is similar to FIG. 1 with the exception being that a punch 30 is used within the rule 16a. The rule 16a is bent to a desired outline and welded to a rigid metal backing plate 18a. This backing plate has an opening 32 which serves to position the punch 30. The punch 30 has an annular flange 34 which fits into the opening 32. The punch can also be further positioned for accuracy by the use of a metal insert 36 which has been cut to snugly fit the interior of rule 16a and the punch 30. A hole 38 is provided in the insert 36 to permit the plastic 24a to run into the space under the insert 36. The plastic is filled up to a point where the punch 30 is necked down to the desired diameter of the part to be punched.

It can be seen that if the punch 30 breaks, the remaining portion can be knocked out of the back after the upper portion of the cutting device has been removed from the upper plate 12a of the press. A new punch 30 can then be inserted and the upper portion 10a of the cutting device reaffixed in place on the upper plate 12a of the press.

The base plate 2a has a hole 40 therein into which the punched-out part of the work sheet drops. Wider openings 42 and 44 connect the bottom of hole 40 to the bottom of the base plate 2a so that the punched-out parts can drop through the base plate.

On the base plate 2a of the press, it is noted that two male mating members 26a and 26b are shown. This can be done to vary the height of the male mating portion. Also, when cutting steel and titanium, a more rigid male mating member is desired.

Figure 4:
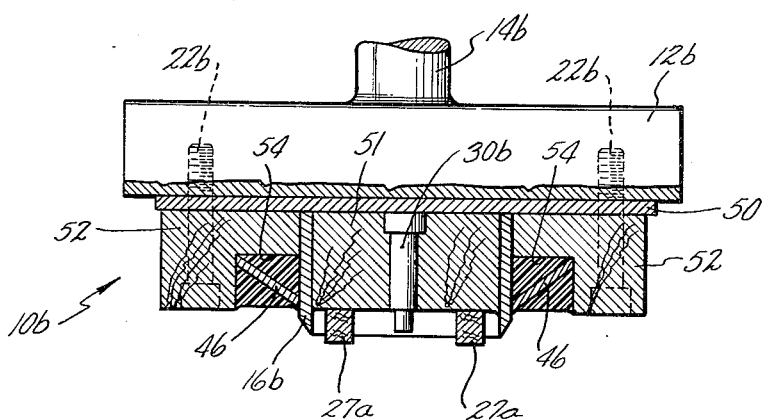
FIG. 4 is a side view showing another modification of the upper half of the cutting device.

In FIG. 4, the upper portion of the cutting device is fabricated by bending it to a desired shape and placing an inner solid member 51 which mates with the inner portion of the rule and placing an outer solid portion 52 around the rule which mates with the outer portion of the rule. The members 51 and 52 are of such a height which permits the cutting edge of the rule to project. A portion is cut from the outer member 52 immediately adjacent the rule for its entire periphery providing a trough 54 around the rule. Supporting members 46 are placed between a supporting point in the trough of the outer member and the rule to accurately position the cutting edge of the rule. When the exact contour is obtained, plastic is poured for the entire depth of the trough. A punch 30b is shown as similar to the punch in FIG. 3. A plate 50 is shown backing up the upper portion 10b of the cutting device. This plate 50 can be used if there are cutouts or openings in the surface of the upper plate of the press.

The upper portion of the cutting device can be formed of only a backing plate 18, rule 16 and plastic 24 as shown in FIG. 1. The backing plate 18 would be fixed to the upper plate 12 of the press. This type of upper portion would be used where rigid outer support of the rule is not needed.

It is to be understood that the invention is not limited to the figures herein shown and described, but may be used in other ways without departure from its spirit as defined in the following claims.

I claim:

1. A method of making a rule cutting device which comprises:
   (a) forming a rule having a cutting edge to a desired shape,
   (b) placing a block of the same contour as the inner side of the rule into the space enclosed by the rule,
   (c) placing a larger block having a cutout portion of the same contour as the outer shape of said rule around the outside of said rule,
   (d) forming a trough around the inner periphery of the opening in the top of the outer block which extends to the surface of the rule,
   (e) placing supporting members between a portion of said trough and the outer side of the rule positioning said members until the rule conforms to the precise shape desired, and
   (f) filling the trough with a hardening plastic.

2. A method of making a rule cutting device which comprises:
   (a) forming a rule having a cutting edge to a desired shape,
   (b) fixing said rule to one side of a flat plate with said cutting edge projecting away from said plate,
   (c) placing the other side of said flat plate on a surface which extends beyond the outer periphery of the plate,
   (d) placing a confining fence on the surface around the edges of said flat plate and rule with said cutting edge projecting above the top of said confining fence,
   (e) pouring a hardening plastic into the space between said fence and rule to a desired height, and
   (f) removing the flat plate, plastic and fence from said surface when said plastic has hardened.

3. A method of making a rule cutting device which comprises:
   (a) forming a rule having a cutting edge to a desired shape,
   (b) fixing said rule to one side of a flat plate with said cutting edge projecting away from said plate,
   (c) placing the other side of said flat plate on a surface which extends beyond the outer periphery of the plate,
   (d) placing a confining fence on the surface around the edges of said flat plate and rule with said cutting edge projecting above the top of said confining fence,
   (e) pouring a hardening plastic into the space between said fence and rule to a desired height,
   (f) pouring a hardening plastic into the space within said rule to a desired height, and
   (g) removing thhe flat plate, plastic and fence from said surface when said plastic has hardened.

4. A method of making a rule cutting device which comprises:
   (a) forming a rule having a cutting edge to a desired shape,
   (b) fixing said rule to one side of a flat plate with said cutting edge projecting away from said plate,
   (c) placing the other side of said flat plate on a surface which extends beyond the outer periphery of the plate,
   (d) placing a confining fence on the surface around the edges of said flat plate and rule with said cutting edge projecting above the top of said confining fence,
   (e) pouring a hardening plastic into the space between said fence and rule to a desired height,
   (f) pouring a hardening plastic into the space within said rule to a desired height,
   (g) removing the flat plate, plastic and fence from said surface when said plastic has hardened, and
   (h) fixing a stripper to the hardened plastic within said rule which extends to a point past the cutting edge of the rule.

5. A mehod of making a rule cutting device which comprises:
   (a) forming a rule having a cutting edge to a desired shape,
   (b) fixing said rule to one side of a flat plate with said cutting edge projecting away from said plate,
   (c) placing the other side of said flat plate on a surface which extends beyond the outer periphery of the plate,
   (d) placing a confining fence on the surface around the edges of said flat plate and rule with said cutting edge projecting above the top of said confining fence,
   (e) pouring a hardening plastic into the space between said fence and rule to a desired height,
   (f) pouring a hardening plastic into the space within said rule to a desired height,
   (g) removing the unit from said surface when said plastic has hardened,
   (h) placing said unit on the top plate of a press,
   (i) adhering a strip of sheet material to the bottom plate of a press below said unit,
   (j) cutting a male die from said sheet material, and
   (k) leaving said male die and removing the excess.

6. A method of making a rule cutting device which comprises:
   (a) forming a rule having a cutting edge to a desired shape,
   (b) fixing said rule to one side of a flat plate with said cutting edge projecting away from said plate,
   (c) cutting a hole in said flate plate within the rule,
   (d) placing the other side of said flat plate on a surface which extends beyond the outer periphery of the plate,
   (e) placing the bottom of a punch in said hole,
   (f) placing a confining fence on the surface around the edges of said flat plate and rule with said cutting edge projecting above the top of said confining fence,
   (g) pouring a hardening plastic into the space between said fence and rule to a desired height,
   (h) pouring a hardening plastic into the space within said rule around the punch to a desired height, and
   (i) removing the flat plate, plastic and fence from said surface when said plastic has hardened.

7. A method of making a rule cutting device which comprises:
   (a) forming a rule having a cutting edge to a desired shape,
   (b) fixing said rule to one side of a flat plate with said cutting edge projecting away from said plate,
   (c) cutting a hole in said flat plate with the rule,
   (d) placing the other side of said flat plate on a surface which extends beyond the outer periphery of the plate,
   (e) placing the bottom of a punch in said hole,
   (f) placing a plate snugly within said cutting edge and around said punch for positioning said punch,
   (g) placing a confining fence on the surface around the edges of said flat plate and rule with said cutting edge projecting above the top of said confining fence, (h) pouring a hardening plastic into the space between said fence and rule to a desired height, (i) pouring a hardening plastic in to the space within said rule around the punch above and below said positioning plate to a desired height, and (j) removing the flat plate, plastic, and fence from said surface when said plastic has hardened.

8. A method of making a rule cutting device which comprises:
(a) forming a steel rule having a cutting edge to a desired shape,
(b) welding said rule to one side of a flat metal plate with said cutting edge projecting away from said plate,
(c) placing the other side of said flat plate on a surface which extends beyond the outer periphery of the plate,
(d) placing a confining fence on the surface around the edges of said flat plate and rule with said cutting edge projecting above the top of said confining fence,
(e) pouring a hardening plastic into the space between said fence and rule to a desired height,
(f) permitting said plastic to harden, and
(g) removing the flat plate, plastic and fence from said surface when said plastic has hardened.

9. A method of making a female rule cutting die which comprises:
(a) forming a rule having a cutting edge to a desired shape and fixing said rule to one side of a solid flat plate with said cutting edge projecting away from said plate,
(b) placing the other side of said flat plate on a surface which extends beyond the outer periphery of the plate,
(c) next placing a confining fence on the surface spaced from the edges of said flat plate and rule with said cutting edge projecting above the top of said confining fence,
(d) then pouring a hardening plastic into the space between said fence and rule to a desired height, and
(e) then removing the flat plate, plastic and fence from said surface when said plastic has hardened.

References Cited by the Examiner

UNITED STATES PATENTS

| | | | |
|---|---|---|---|
| 2,423,601 | 7/47 | MacArthur | 83—690 |
| 2,821,871 | 2/58 | Sarno | 76—107 |
| 2,899,849 | 8/59 | Laughter et al. | 76—107 |
| 3,000,251 | 9/61 | Berlin et al. | 83—690 |
| 3,020,785 | 2/62 | Leavesley et al. | 76—107 |
| 3,025,727 | 3/62 | Smith | 76—107 |
| 3,052,139 | 9/62 | Trimble | 76—107 |
| 3,108,327 | 10/63 | Phillips et al. | 76—107 |

GRANVILLE Y. CUSTER, JR., *Primary Examiner.*

FRANK H. BRONAUGH, *Examiner.*